US012785101B2

(12) United States Patent
Cheng et al.

(10) Patent No.: US 12,785,101 B2
(45) Date of Patent: Nov. 3, 2026

(54) AQUEOUS POSITIVE ELECTRODE SHEET, AND SECONDARY BATTERY INCLUDING THE ELECTRODE SHEET, AND POWER CONSUMPTION APPARATUS

(71) Applicant: CONTEMPORARY AMPEREX TECHNOLOGY (HONG KONG) LIMITED, Hong Kong (HK)

(72) Inventors: Cong Cheng, Ningde (CN); Haile Pei, Ningde (CN); Junguang Chen, Ningde (CN); Shengwu Zhang, Ningde (CN); Xinghui Wang, Ningde (CN); Shisong Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 618 days.

(21) Appl. No.: 18/324,680

(22) Filed: May 26, 2023

(65) Prior Publication Data

US 2023/0361305 A1 Nov. 9, 2023

Related U.S. Application Data

(63) Continuation of application No. PCT/CN2021/142609, filed on Dec. 29, 2021.

(51) Int. Cl.
*H01M 4/62* (2006.01)
*H01M 4/136* (2010.01)
(Continued)

(52) U.S. Cl.
CPC ........... *H01M 4/622* (2013.01); *H01M 4/136* (2013.01); *H01M 4/5825* (2013.01);
(Continued)

(58) Field of Classification Search
CPC ........................ H01M 4/622; H01M 2004/021
See application file for complete search history.

(56) References Cited

U.S. PATENT DOCUMENTS

2015/0188120 A1* 7/2015 Li ....................... H01M 4/1397
427/8
2016/0133940 A1 5/2016 Kim et al.
2019/0225792 A1 7/2019 Zhang et al.

FOREIGN PATENT DOCUMENTS

CN 103326027 A 9/2013
CN 107785582 3/2018
(Continued)

OTHER PUBLICATIONS

CN111668487 English translation. Luo. China. Sep. 15, 2020. (Year: 2020).*
(Continued)

*Primary Examiner* — Christopher P Domone
(74) *Attorney, Agent, or Firm* — Ladas & Parry, LLP

(57) ABSTRACT

The present application relates to an aqueous positive electrode sheet, including a current collector and a positive electrode active substance layer provided on at least one surface of the current collector, the positive electrode active substance layer including an aqueous binder, where bond strength AT between the positive electrode active substance layer and the current collector and cohesive CT of the positive electrode active substance layer itself satisfy the following relationship: 1≤CT/AT≤10. The present application further relates to a secondary battery including the aqueous positive electrode sheet, a battery pack including the secondary battery, and a power consumption apparatus including the battery pack.

18 Claims, 4 Drawing Sheets

(51) Int. Cl.

*H01M 4/58* (2010.01)
*H01M 4/66* (2006.01)
*H01M 10/0525* (2010.01)
*H01M 4/02* (2006.01)

(52) U.S. Cl.

CPC .......... *H01M 4/625* (2013.01); *H01M 4/661* (2013.01); *H01M 10/0525* (2013.01); *H01M 2004/021* (2013.01); *H01M 2004/028* (2013.01); *H01M 2220/20* (2013.01)

(56) References Cited

FOREIGN PATENT DOCUMENTS

| | | | |
|---|---|---|---|
| CN | 107925058 | | 4/2018 |
| CN | 111354949 | | 6/2020 |
| CN | 111668487 | * | 9/2020 |
| CN | 112234163 | | 1/2021 |
| CN | 113748549 | A | 12/2021 |
| WO | 2020134707 | A1 | 7/2020 |

OTHER PUBLICATIONS

ISR for International Application PCT/CN2021/142609 mailed Sep. 1, 2022.

Written Opinion for International Application PCT/CN2021/142609 mailed Sep. 1, 2022.

EP Office Action issued for copending application 21 964 279.0-1103 dated Jun. 2, 2025.

Extended European Search Report for Application No. 21964279.0, dated Sep. 16, 2024, 11 pages.

SR for International Application PCT/CN2021/142609 mailed Sep. 1, 2022.

Office Action in European Application No. 21964279.0, issued on Oct. 16, 2025.

Office action from corresponding Chinese Patent Application No. 202180092928.5 dated May 30, 2026 with search report.

* cited by examiner

Before treatment (91.86°)

After treatment (33.86°)

AQUEOUS POSITIVE ELECTRODE SHEET, AND SECONDARY BATTERY INCLUDING THE ELECTRODE SHEET, AND POWER CONSUMPTION APPARATUS

CROSS-REFERENCE TO RELATED APPLICATION

The present application is a continuation of International Patent Application No. PCT/CN2021/142609 filed Dec. 29, 2021. The disclosures of the aforementioned patent application is incorporated herein by reference in their entirety.

TECHNICAL FIELD

The present application relates to the field of secondary batteries, and in particular, to an aqueous positive electrode sheet having improved mechanical properties and electrical properties, and a secondary battery including the positive electrode sheet, a battery pack and a power consumption apparatus thereof.

BACKGROUND

Secondary batteries have become the most popular energy storage systems due to low cost, long life, and good safety thereof, which have been widely used in pure electric vehicles, hybrid electric vehicles, and smart grids. High safety and low cost are key directions for a sustainable development of power/energy storage battery market technologies. Positive electrode material lithium ion batteries of lithium iron phosphate (LFP) have great advantages in terms of safety due to characteristics of stable structure and high temperature decomposition resistance of a lithium iron phosphate material, and the lithium iron phosphate material does not include heavy metals, and the cost is also low, so it has developed rapidly in recent years.

Most of positive electrodes of existing power batteries adopt an oiliness formulation for slurry production, which is generally a system composed of a binder of polyvinylidene fluoride (PVDF) and a solvent of N-methylpyrrolidone (NMP). However, both PVDF and NMP are petroleum-derived chemical products. During the slurry mixing and coating, a large amount of NMP toxic gases may volatilize into the air, pollute the environment and cause harm to the human body. In addition, the synthesis and post-treatment process of NMP and PVDF are complex, with high energy consumption and high application cost. Based on this, the battery industry has attempted to develop an aqueous positive electrode system. On the one hand, it can avoid use of an organic solvent NMP and reduce harm to the environment and human beings, and on the other hand, it does not relate to extensive use of fluoropolymer PVDF and complicated recovery of the NMP solvent thereof. It can achieve the large-scale cost reduction application due to low battery production cost.

Although deionized water may be used instead of the solvent NMP in the aqueous binder system, water-soluble binders for secondary batteries developed in the market such as styrene-butadiene emulsion (SBR), hydroxymethyl cellulose (CMC), polyacrylate (PAA), polytetrafluoroethylene emulsion (PTFE) generally have problems, such as uneven dispersion of solid materials, poor consistency and low stability of aqueous positive electrode slurries, and prone to sedimentation, and poor bond strength of electrode sheets and high brittleness, such that the requirements for the use of lithium ion secondary batteries cannot be satisfied. Although there are reports in the industry that the brittleness of electrode sheets may be improved by plasticizers, the effect is limited.

Therefore, the current aqueous positive electrode sheet is still not satisfactory in terms of improving the mechanical properties of the electrode sheet and the dynamics performance of the battery. The aqueous positive electrode sheet with the improved characteristics is still needed in the art.

SUMMARY

The present application is made in view of the above subjects, which aims to provide an aqueous positive electrode sheet to solve a technical problem of improving mechanical properties of an electrode sheet, especially flexibility, and further improving dynamics performance of a battery.

In order to achieve the above aim, a first aspect of the present application provides an aqueous positive electrode sheet, including a current collector and a positive electrode active substance layer provided on at least one surface of the current collector, the positive electrode active substance layer including an aqueous binder, where bond strength AT between the positive electrode active substance layer and the current collector and cohesive CT of the positive electrode active substance layer itself satisfy the following relationship: $1 \leq CT/AT \leq 10$. In a further embodiment, a range of a ratio of CT to AT is 2-8, optionally 3-5. By setting a ratio range of the cohesive CT of the positive electrode active substance layer itself to the bond strength AT between the positive electrode active substance layer and the current collector, a balance of the cohesive of an electrode sheet and the bond strength of a film layer in the aqueous positive electrode sheet may be adjusted.

In any embodiment, a contact angle between the current collector and water is 5°-90°, optionally 20°-70°. By adjusting the contact angle between the current collector and the water, bond performance between the current collector and the positive electrode active substance layer may be adjusted.

In any embodiment, the bond strength AT between the positive electrode active substance layer and the current collector is 6-45 N/m, optionally 10-35 N/m. In any embodiment, the cohesive CT of the positive electrode active substance layer is 40-140 N/m, optionally 60-120 N/m. By setting the bond strength AT and the cohesive CT within a specific range, it may further improve the performance of the electrode sheet.

In any embodiment, a proportion of the aqueous binder in the positive electrode active substance layer is 0.5-10 weight %, optionally 1.5-5 weight %, based on the total weight of the positive electrode active substance layer. By adjusting the proportion of the aqueous binder in the positive electrode active substance layer, the proportion of the positive electrode active substance in an electrode sheet formulation may be maintained, which is conducive to the maintenance of battery capacity.

In any embodiment, the current collector includes surface modified aluminum foil. The surface modified aluminum foil may further improve the bond strength with the positive electrode active substance layer and the dynamics performance of the battery.

In any embodiment, the current collector includes the current collector pretreated and activated by high surface energy, and the pretreatment process includes corona treatment, plasma treatment, rolling, polar solvent coating, or a combination thereof. The current collector is pretreated and activated by the high surface energy, which may further improve the bond strength between the current collector and the positive electrode active substance layer.

In any embodiment, a treatment voltage in the corona treatment is 5-30 kV, optionally 10-25 kV. By selecting the corona treatment to activate the current collector with the high surface energy, and further selecting an appropriate treatment voltage, it may further improve the membrane resistance and battery dynamics.

In any embodiment, the positive electrode active substance layer includes a positive electrode active material, and the positive electrode active material is selected from one or more of lithium iron phosphate, lithium manganese phosphate, lithium cobalt phosphate, lithium iron manganese phosphate, lithium cobalt oxide, lithium nickel oxide, lithium manganese oxide, lithium nickel manganese oxide, lithium nickel cobalt manganese oxide, and lithium nickel cobalt aluminum oxide. In any embodiment, the positive electrode active substance layer includes a conductive agent, and the conductive agent includes one or more of conductive carbon black, superconducting carbon black, conductive graphite, acetylene black, Ketjen black, graphene, and carbon nanotubes. The selection of the positive electrode active material and the conductive agent may broaden the structure and type of the positive electrode active substance layer of the positive electrode sheet, and achieve a wider adjustment range.

In any embodiment, the aqueous binder includes soluble polysaccharides and derivatives thereof, water-soluble or water-dispersed high polymers or mixtures thereof. In a further embodiment, the aqueous binder is methylcellulose and salt thereof, xanthan gum and salt thereof, chitosan and salt thereof, alginate and salt thereof, polyethyleneimine and salt thereof, polyacrylamide, acrylonitrile-acrylic acid copolymers and derivatives thereof, or mixtures of the above substances. By selecting a specific type of the aqueous binder, the continuous improvement of the mechanical properties of the positive electrode sheet, especially the flexibility, may be achieved.

In any embodiment, the aqueous binder is a compound mixture of soluble polysaccharides and derivatives thereof and water-soluble or water-dispersed high polymers, and a compound ratio is 2:1-1:15, optionally 1:2-1:14. In a further embodiment, the aqueous binder is a compound mixture of xanthan gum and polyethyleneimine, and a compound ratio is 2:1-1:15, optionally 1:2-1:14; optionally, the average molecular weight Mn of the xanthan gum is 300000-2000000 g/mol, and the average molecular weight Mn of the polyethyleneimine is 2000-50000 g/mol. A combination of the selected specific aqueous binder and a ratio thereof may achieve the best performance improvement, including the mechanical properties of the positive electrode sheet and the dynamics performance of the battery.

In any embodiment, a membrane resistance of the positive electrode sheet is 0.3 to 1Ω. The membrane resistance of the positive electrode of the present application is significantly reduced, further improving the dynamics performance of the secondary battery including the positive electrode sheet.

A second aspect of the present application provide a secondary battery, including the aqueous positive electrode sheet selected from the first aspect of the present application.

A third aspect of the present application provides a battery pack, including the secondary battery selected from the second aspect of the present application.

A fourth aspect of the present application provides a power consumption apparatus, including the secondary battery selected from the second aspect of the present application or the battery pack selected from the third aspect of the present application.

BRIEF DESCRIPTION OF DRAWINGS

In order to illustrate the technical solutions of the present application more clearly, the following will briefly introduce the drawings used in embodiments of the present application. Apparently, the drawings described below are merely some embodiments of the present application, and those skilled in the art may still derive other drawings from these drawings without creative labor.

DESCRIPTION OF REFERENCE SIGNS

Figure 1:
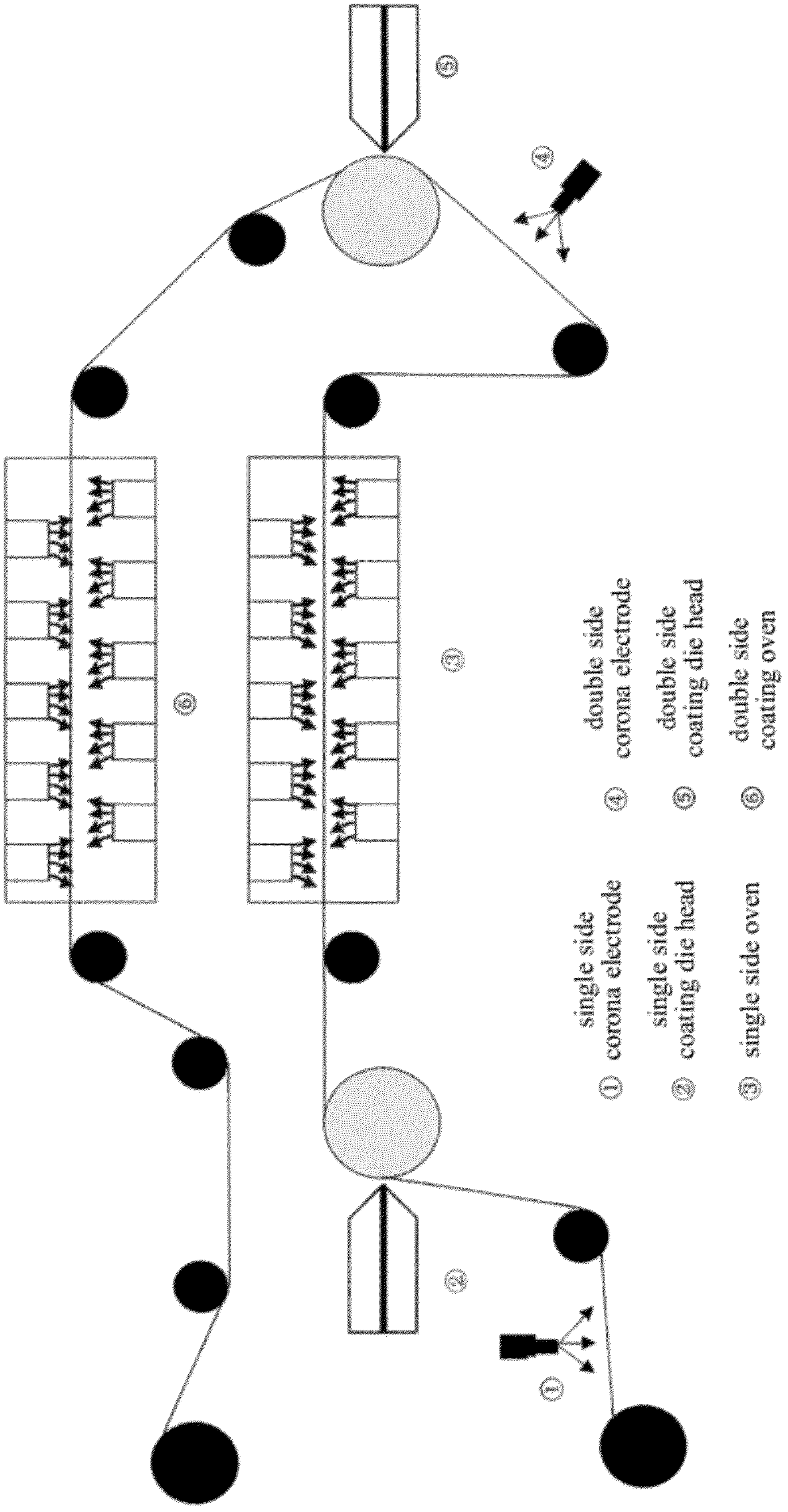
FIG. 1 is a schematic diagram of corona treatment on one side and/or both sides of a positive electrode current collector according to an embodiment of the present application.

1 battery pack
2 upper box body
3 lower box body
4 battery module
5 lithium ion secondary battery
51 housing
52 electrode assembly
53 cover plate

DESCRIPTION OF EMBODIMENTS

For the sake of brevity, the present application specifically discloses some numerical ranges. However, any lower limit may be combined with any upper limit to form an unspecified range, and any lower limit may be combined with any other lower limits to form an unspecified range, and likewise any upper limit may be combined with any other upper limits to form an unspecified range. In addition, each individually disclosed point or individual value may serve as a lower or upper limit by itself in combination with any other points or individual values or with other lower or upper limits to form an unspecified range.

In the composition of an aqueous positive electrode sheet, the selection of an aqueous binder is very important. Currently, the binder mainly includes the following types: butadiene-styrene copolymer (SBR) and derivatives thereof, sodium carboxymethylcellulose (CMC-Na) and derivatives thereof, acrylonitrile-acrylate copolymer and derivatives thereof (LA series), and the like. Among them, if merely thermoelastic binders such as SBR and silicone rubber are adopted for the aqueous positive electrode sheet, although a problem of brittleness of the electrode sheet may be effectively solved, bond strength between a current collector of the electrode sheet and a film layer of the electrode sheet is insufficient, such that the electrode sheet may easily produce powder loss, or even large area demoulding, which may cause polarization of the battery and increase an internal resistance, affect a rate and cycle performance of the battery, and even affect safety performance of the battery in severe cases. In particular, a SBR molecule includes double bonds, which is easily oxidized and decomposed when used in a high-voltage positive electrode system, and may also bring a certain side effect to performance of the battery. However, due to the existence of sodium carboxylate ionic bonds and polar functional groups on a main chain of CMC-Na and LA series, the intermolecular/internal force of a polymer is large, the internal stress of the polymer is too large when coating and drying, the brittleness of the electrode sheet increases, the flexibility becomes poor, and the coating is easy to crack. After drying, the electrode sheet is easy to break when it is bent, and the winding cannot be achieved. Although the cohesive of the electrode sheet and the bond strength of the film layer may be balanced by using a multiple binder compound system, an improvement effect is very limited. More importantly, due to the type of the binder and the high content, a proportion of an active substance in an electrode sheet formulation is significantly reduced, which is not conducive to maintaining a battery capacity and cannot satisfy an urgent requirement of a high energy density of the battery.

The present inventors have found through research and study that, on the one hand, by optimizing the type of the binder and the proportion of the aqueous positive electrode sheet, and on the other hand, by roughening the substrate and modifying the polar bonding, a balance between the bond strength of the current collector and the positive electrode active substance layer and the cohesive of the positive electrode active substance layer itself is achieved. On the premise of ensuring that the positive electrode active substance layer does not loss the powder and demould, high flexibility performance of the electrode sheet is achieved, especially the flexibility of the electrode sheet with thick coating and high pressure dense is maintained.

Specifically, a first aspect of the present application provides an aqueous positive electrode sheet, including a current collector and a positive electrode active substance layer provided on at least one surface of the current collector, the positive electrode active substance layer including an aqueous binder, where bond strength AT between the positive electrode active substance layer and the current collector and cohesive CT of the positive electrode active substance layer itself satisfy the following relationship: $1 \leq CT/AT \leq 10$. In a further embodiment, a range of a ratio of CT to AT is 2-8, optionally 3-5. If the ratio of CT/AT is too small, the cohesive of the positive electrode active substance layer itself is insufficient, which is easy to crack internally; and if the ratio of CT/AT is too large, the bond strength between the current collector and the film layer of the electrode sheet is insufficient, and the electrode sheet may easily produce the powder loss, or even large area demoulding, which may cause the polarization of the battery and increase the internal resistance, affect the rate and cycle performance of the battery. By setting the range of the ratio of the cohesive CT of the positive electrode active substance layer itself to the bond strength AT between the positive electrode active substance layer and the current collector, the balance of the cohesive of the electrode sheet and the bond strength of the film layer in the aqueous positive electrode sheet may be adjusted.

In some embodiments, a contact angle of the current collector and water is 5°-90°, optionally 20°-70°. The contact angle between the current collector and the water may be adjusted by selecting the type of the current collector and performing a surface treatment on the current collector. By adjusting the contact angle between the current collector and the water and setting it within a specific range, bond performance between the current collector and the positive electrode active substance layer may be adjusted.

In some embodiments, the bond strength AT between the positive electrode active substance layer and the current collector is 6-45 N/m, optionally 10-35 N/m. In some embodiments, the cohesive CT of the positive electrode active substance layer is 40-140 N/m, optionally 60-120 N/m. By setting the bond strength AT and the cohesive CT within a specific range, it may further improve the performance of the electrode sheet. If AT and CT are too high or too low, the balance between the two are easily destroyed, such that the brittleness of the electrode sheet increases, the flexibility deteriorates, and reduce electrical performance of a secondary battery at the same time.

In some embodiments, a proportion of the aqueous binder in the positive electrode active substance layer is 0.5-10 weight %, optionally 1.5-5 weight %, based on the total weight of the positive electrode active substance layer. If the proportion of the aqueous binder is too low, a bond effect is insufficient; and if the proportion of the aqueous binder is too high, the proportion of the active substance in the electrode sheet formulation is significantly reduced, which is not conducive to maintaining the battery capacity and cannot satisfy the requirement for the high energy density of the battery. By adjusting the proportion of the aqueous binder in the positive electrode active substance layer, the proportion of the active substance in the electrode sheet formulation may be maintained, improving a capacity retention rate of the battery.

In some embodiments, the current collector includes surface modified aluminum foil. The surface modified aluminum foil is selected as the current collector, which may combine high conductivity, high stability, high flexibility and good bond performance, and may further improve the bond strength with the positive electrode active substance layer and dynamics performance of the battery.

Figure 2:
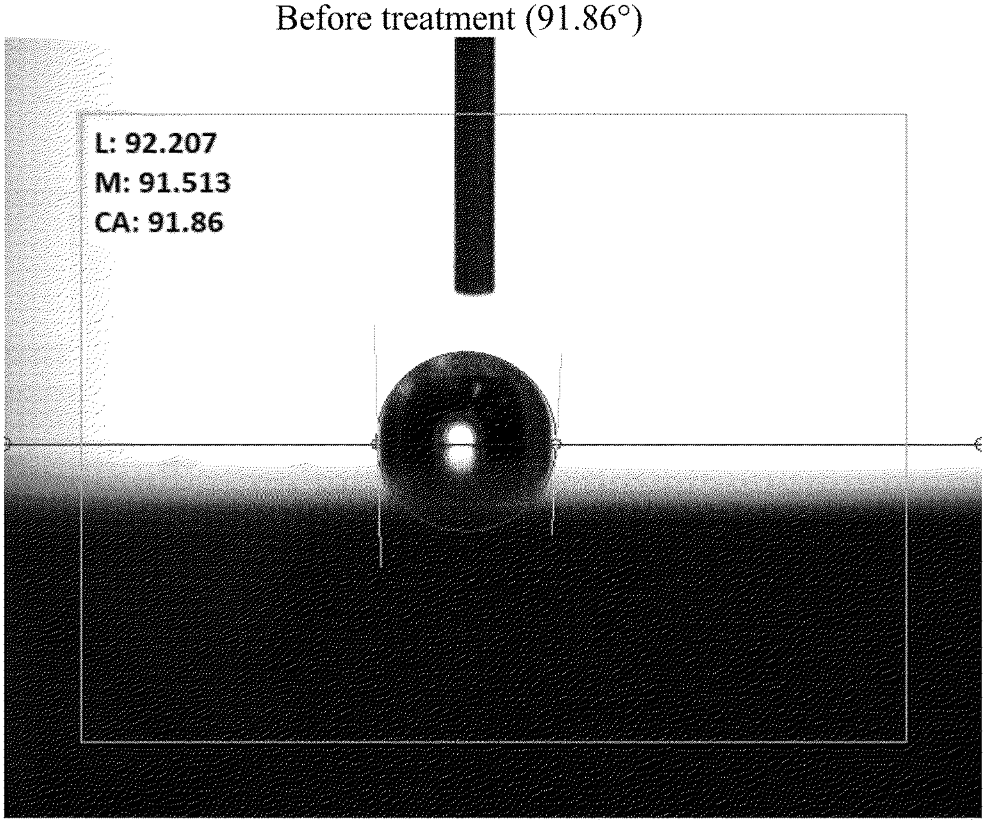
FIG. 2 shows a change of a contact angle with water before and after corona treatment of an aluminum foil current collector according to an embodiment of the present application.
Figure 2:
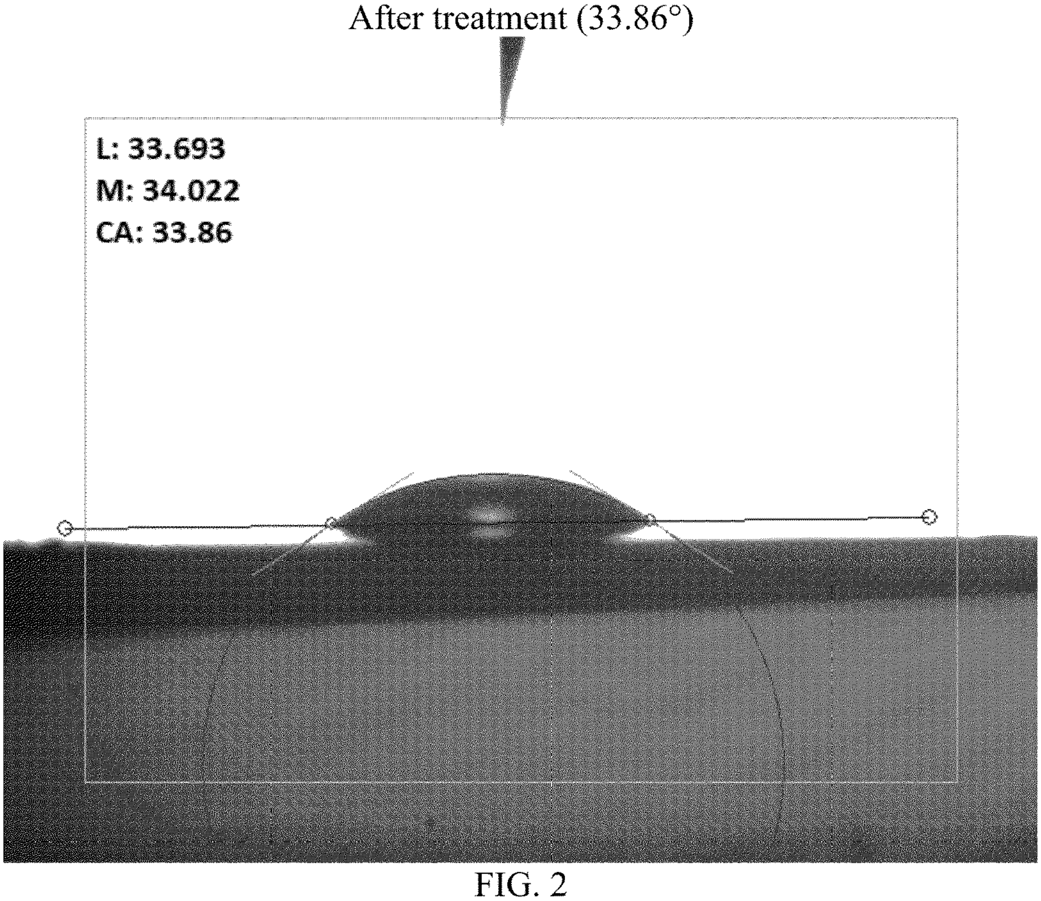

In some embodiments, the current collector includes the current collector pretreated and activated by high surface energy, and the pretreatment process includes corona treatment, plasma treatment, rolling, polar solvent coating, or a combination thereof. It is advantageous to select the corona treatment to make the current collector have the high surface energy, which is conducive to evenly spreading a positive electrode slurry on the current collector, and improving the bond strength between the positive electrode active substance layer and the current collector. FIG. 1 is a schematic diagram of corona treatment on one side and/or both sides of a positive electrode current collector according to an embodiment of the present application. In some embodiments, a treatment voltage during the corona treatment is 5-30 kV, optionally 10-25 kV. In the present invention, the surface roughness and surface energy of the current collector after the corona treatment are significantly increased, and the aqueous positive electrode slurry rapidly spreads on the current collector. On the one hand, the bond strength between the positive electrode active substance layer and the current collector may be significantly increased, and the battery does not demould during the winding; and on the other hand, conductivity between the positive electrode active substance layer and the current collector is significantly increased, and the polarization is reduced, which may significantly improve the cycle performance of the battery. FIG. 2 shows a change of a contact angle with water before and after corona treatment of an aluminum foil current collector according to an embodiment of the present application. After the corona treatment, the contact angle between the aluminum foil current collector and the water is reduced from 91.86° to 33.86°, which makes the aqueous positive electrode slurry spread on the current collector more quickly, and improves the bond strength and the conductivity. Therefore, by selecting an appropriate corona treatment voltage, further improvements in a membrane resistance as well as battery dynamics may be achieved.

In some embodiments, the positive electrode active substance layer includes a positive electrode active material, and the positive electrode active material is selected from one or more of lithium iron phosphate, lithium manganese phosphate, lithium cobalt phosphate, lithium iron manganese phosphate, lithium cobalt oxide, lithium nickel oxide, lithium manganese oxide, lithium nickel manganese oxide, lithium nickel cobalt manganese oxide, and lithium nickel cobalt aluminum oxide. In some embodiments, the positive electrode active substance layer includes a conductive agent, and the conductive agent includes one or more of conductive carbon black, superconducting carbon black, conductive graphite, acetylene black, Ketjen black, graphene, and carbon nanotubes. The selection of the positive electrode active material and the conductive agent may broaden the structure and the type of the positive electrode active substance layer of the positive electrode sheet, and achieve a wider adjustment range.

In some embodiments, the aqueous binder includes soluble polysaccharides and derivatives thereof, water-soluble or water-dispersed high polymers or mixtures thereof. In a further embodiment, the aqueous binder is methylcellulose and salt thereof, xanthan gum and salt thereof, chitosan and salt thereof, alginate and salt thereof, polyethyleneimine and salt thereof, polyacrylamide, acrylonitrile-acrylic acid copolymers and derivatives thereof, or mixtures of the above substances. By selecting a specific type of the aqueous binder, the continuous improvement of mechanical properties of the positive electrode sheet, especially the flexibility, may be achieved.

In some embodiments, the aqueous binder is a compound mixture of soluble polysaccharides and derivatives thereof and water-soluble or water-dispersed high polymers, and a compound ratio is 2:1-1:15, optionally 1:2-1:14. In a further embodiment, the aqueous binder is a compound mixture of xanthan gum and polyethyleneimine, and a compound ratio is 2:1-1:15, optionally 1:2-1:14; optionally, the average molecular weight Mn of the xanthan gum is 300000-2000000 g/mol, and the average molecular weight Mn of the polyethyleneimine is 2000-50000 g/mol. A combination of the selected specific aqueous binders and a ratio thereof may achieve the best performance improvement, including the mechanical properties of the positive electrode sheet and the dynamics performance of the battery.

By optimizing the formulation and compared with a conventional aqueous binder of sodium carboxymethyl cellulose CMC-Na, the present invention adopts a flexible aqueous binder, such as hydroxypropyl methylcellulose HPMC, xanthan gum XG, polyethyleneimine, which may achieve a better balance between the cohesive and the bond strength of the electrode sheet on the premise of ensuring high stability of the slurry. In the present invention, the aqueous binder is used as the binder and the deionized water is used as the solvent to mix and stir to form the slurry, where the slurry is even, a dispersion effect of the conductive agent and the binder is good, the coated electrode sheet has a smooth surface, no particle protrusions, and is firmly bonded with the current collector. A positive electrode material is not easy to lose the powder and demould during the winding, which satisfies the high-speed winding requirements of the electrode sheet, and the assembled battery is stable. This has an effect that, on the one hand, during the application of battery charging and discharging, the film layer of the electrode sheet does not loss the powder and demould, and the structure is stable, which may effectively inhibit the polarization of the electrode sheet, reduce the internal resistance of the battery, thereby improving the capacity retention rate of the battery; and on the other hand, the electrode sheet has the strong flexibility and may withstand the stress increase caused by the expansion of the electrode sheet during the battery charging and discharging, and electrode sheet may not break, ensuring the safety and reliability when applying the battery.

In some embodiments, a membrane resistance of the positive electrode sheet is 0.3 to 1Ω. The membrane resistance of the positive electrode sheet of the present application is significantly lower than that of the conventionally used positive electrode sheet, which further improves the dynamics performance of the battery including the positive electrode sheet.

A second aspect of the present application provides a secondary battery, including the aqueous positive electrode sheet according to the first aspect of the present application. In some embodiments, the secondary battery is a lithium ion secondary battery. The lithium ion secondary battery has a positive electrode sheet, a negative electrode sheet, a separator, and an electrolytic solution, the positive electrode sheet includes a positive electrode current collector and a positive electrode active substance layer provided on at least one surface of the positive electrode current collector, and the positive electrode active substance layer includes a positive electrode active material and a conductive agent.

A battery cell of the secondary battery will be described in detail below.

Typically, a lithium ion secondary battery includes a positive electrode sheet, a negative electrode sheet, a separator, and an electrolyte. During charging and discharging of a battery, active ions are intercalated and disintercalated back and forth between the positive electrode sheet and the negative electrode sheet. The separator is provided between the positive electrode sheet and the negative electrode sheet for separation. The electrolyte plays the role of conducting the ions between the positive electrode sheet and the negative electrode sheet.

[Electrolytic Solution]

An electrolytic solution plays the role of conducting ions between a positive electrode sheet and a negative electrode sheet. The electrolytic solution includes an electrolyte salt and a solvent.

In the present application, the electrolyte salt may be a common electrolyte salt in lithium ion secondary batteries, such as lithium salt, including the above lithium salt as a high thermal stability salt, lithium salt as a low impedance additive, or lithium salt inhibiting aluminum foil corrosion. As an example, the electrolyte salt may be selected from more than one of $LiPF_6$ (lithium hexafluorophosphate), $LiBF_4$ (lithium tetrafluoroborate), $LiAsF_6$ (lithium hexafluoroarsenate), LiFSI (lithium bis(fluorosulfonyl)imide), LiTFSI (bistrifluoromethanesulfonimide lithium), LiTFS (lithium trifluoromethanesulfonate), LiDFOB (lithium difluoro (oxalato) borate), $LiPO_2F_2$ (lithium difluorophosphate), LiDFOP (lithium difluorodifluorooxalate phosphate), $LiSO_3F$ (lithium fluorosulfonate), NDFOP (difluorodioxalate), $Li_{2F}(SO_2N)_2SO_2F$, KFSI, CsFSI, $Ba(FSI)_2$ and $LiFSO_2NSO_2CH_2CH_2CF_3$.

The type of the solvent is not particularly limited, and may be selected according to the actual requirements. In some embodiments, the solvent is a non-aqueous solvent. Optionally, the solvent may include one or more of chain carbonate, cyclic carbonate, and carboxylate ester. In some embodiments, the solvent may be selected from one or more of ethylene carbonate (EC), propylene carbonate (PC), methyl ethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetrahydrofuran, sulfolane (SF), dimethyl sulfone (MSM), methyl ethyl sulfone (EMS), and diethyl sulfone (ESE).

In some embodiments, the electrolytic solution further optionally includes other additives. For example, the additive may include a negative electrode film-forming additive, or may include a positive electrode film-forming additive, or may further include an additive that can improve specific performance of the battery, such as, an additive for improving overcharge performance of the battery, an additive for improving high temperature performance of the battery, and an additive for improving low temperature performance of the battery. As an example, the additive is selected from at least one of cyclic carbonate compounds, halogen-substituted cyclic carbonate compounds, sulfate compounds, sulfite compounds, sultone compounds, disulfonic acid compounds, nitrile compounds, aromatic compounds, isocyanate compounds, phosphazene compounds, cyclic acid anhydride compounds, phosphite compounds, phosphoric ester compounds, borate ester compound, and carboxylate ester compounds.

[Positive Electrode Sheet]

A positive electrode sheet includes a positive electrode current collector and a positive electrode active substance layer provided on at least one surface of the positive electrode current collector, and the positive electrode active substance layer includes a positive electrode active material and a conductive agent.

As an example, the positive electrode current collector has two surfaces opposite in its own thickness direction, and the positive electrode active substance layer is provided on either or both of the two opposite surfaces of the positive electrode current collector.

In the lithium ion secondary battery of the present application, the positive electrode current collector may be metal foil or a composite current collector. For example, as the metal foil, aluminum foil may be adopted. The composite current collector may include a polymer material base layer and a metal layer formed on at least one surface of the polymer material base layer. The composite current collector may be formed by forming a metal material (such as aluminium, aluminium alloys, nickel, nickel alloys, titanium, titanium alloys, silver and silver alloys, etc.) on the polymer material base layer (such as polypropylene (PP), polyethylene terephthalate (PET), polybutylene terephthalate (PBT), polystyrene (PS), polyethylene (PE), and other substrates).

The positive electrode active substance layer provided on the surface of the positive electrode current collector includes a positive electrode active material. The positive electrode active material used in the present application may have any conventional positive electrode active material used in the secondary battery. In some embodiments, the positive electrode active material may include one or more selected from lithium transition metal oxide, lithium containing phosphate with olivine structure, and respective modified compounds thereof. Examples of lithium transition metal oxides may include, but are not limited to, one or more of lithium cobalt oxides, lithium nickel oxides, lithium manganese oxides, lithium nickel cobalt oxides, lithium manganese oxides, lithium nickel manganese oxides, lithium nickel cobalt manganese oxides, lithium nickel cobalt aluminum oxide, and modified compounds thereof. Examples of lithium containing phosphates with olivine structure may include, but are not limited to, one or more of lithium iron phosphate, composite materials of lithium iron phosphate and carbon, lithium manganese phosphate, composite materials of lithium manganese phosphate and carbon, lithium manganese iron phosphate, and composite materials of lithium manganese iron phosphate and carbon, and modified compounds thereof. These materials are all commercially available. Carbon may be coated on the surface of the positive electrode active material.

The positive electrode active substance layer optionally includes a conductive agent. However, the type of the conductive agent is not specifically limited, and those skilled in the art can select it according to the actual requirements. As an example, the conductive agent for the positive electrode material may be selected from one or more of superconducting carbon, acetylene black, carbon black, Ketjen black, carbon dots, carbon nanotubes, graphene, and carbon nanofibers.

The positive electrode active substance layer may further optionally include a binder. As an example, the binder may be one or more of styrene butadiene rubber (SBR), aqueous acrylic acid resin, polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA), and polyvinyl butyral (PVB).

In the present application, the positive electrode sheet may be prepared according to methods known in the art. As an example, the positive electrode material coated with carbon, conductive agent, and binder may be dispersed in a solvent (such as N-methylpyrrolidone (NMP)) to form an even positive electrode slurry, then the positive electrode slurry is coated on the positive electrode current collector, and after drying, cold pressing and other processes, the positive electrode sheet is obtained.

[Negative Electrode Sheet]

A negative electrode sheet includes a negative electrode current collector and a negative electrode material layer provided on at least one surface of the negative electrode current collector, and the negative electrode material layer includes a negative electrode active substance.

As an example, the negative electrode current collector has two surfaces opposite in its own thickness direction, and the negative electrode material layer is provided on either or both of the two opposite surfaces of the negative electrode current collector.

In a lithium ion secondary battery of the present application, the negative electrode current collector may be metal foil or a composite current collector. For example, as the metal foil, copper foil may be adopted. The composite current collector may include a polymer material base layer and a metal layer formed on at least one surface of the polymer material base layer. The composite current collector may be formed by forming a metal material (such as copper, copper alloys, nickel, nickel alloys, titanium, titanium alloys, silver and silver alloys, etc.) on the polymer material base layer (such as polypropylene (PP), polyethylene terephthalate (PET), polybutylene terephthalate (PBT), polystyrene (PS), polyethylene (PE), and other substrates).

In the lithium ion secondary battery of the present application, the negative electrode material layer typically includes a negative electrode active substance, an optional binder, an optional conductive agent, and other optional additives, which is typically formed by coating and drying a negative electrode slurry. The negative electrode slurry is typically formed by dispersing the negative electrode active substance and optional conductive agent and binder in a solvent and evenly stirring. The solvent may be N-methylpyrrolidone (NMP) or deionized water.

A specific type of the negative electrode active substance is not limited, the active substance known in the art that may be used as a negative electrode of the lithium ion secondary battery may be adopted, and those skilled in the art may select it according to the actual requirements. As an example, the negative electrode active substance may be selected from one or more of graphite, soft carbon, hard carbon, mesocarbon microspheres, carbon fibers, carbon nanotubes, elemental silicon, silicon oxide compounds, silicon carbon composites, and lithium titanate.

As an example, the conductive agent may be selected from one or more of superconducting carbon, acetylene black, carbon black, Ketjen black, carbon dots, carbon nanotubes, graphene, and carbon nanofibers.

As an example, the binder may be selected from one or more of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

Other optional adjuvants are, for example, thickeners (such as carboxymethylcellulose sodium (CMC-Na)).

[Separator]

A lithium ion secondary battery adopting an electrolytic solution further includes a separator. The separator is provided between the positive electrode sheet and the negative electrode sheet for separation. The type of the separator is not particularly limited in the present application, and any well known porous-structure separator having good chemical stability and mechanical stability may be selected. In some embodiments, a material of the separator may be selected from one or more of glass fiber, nonwoven fabric, polyethylene, polypropylene, and polyvinylidene fluoride. The separator may be a single-layer thin film or a multi-layer composite thin film, which is not particularly limited. When the separator is the multi-layer composite thin film, each layer may have the same or different materials, which is not particularly limited.

In some embodiments, the positive electrode sheet, the negative electrode sheet, and the separator may prepare an electrode assembly by a winding process or a lamination process.

In some embodiments, the lithium ion secondary battery may include an outer packaging. The outer packaging may be used to seal and package the above electrode assembly and electrolyte.

In some embodiments, the outer packaging of the lithium ion secondary battery may be a hard housing, such as a hard plastic housing, an aluminum housing, a steel housing, and the like. The outer packaging of the lithium ion secondary battery may also be a soft packaging, such as, a bag type soft packaging. A material of the soft packaging may be plastic, for example, polypropylene (PP), polybutylene terephthalate (PBT), and polybutylene succinate (PBS) may be listed.

Figure 3:
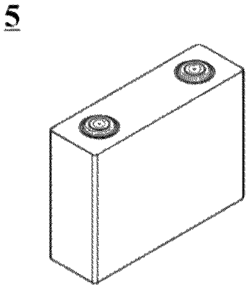
FIG. 3 is a schematic diagram of a lithium ion secondary battery according to an embodiment of the present application.

The present application has no particular limitation on a shape of the lithium ion secondary battery, which may be a cylinder, a square, or any other shape. For example, FIG. 3 is a lithium ion secondary battery 5 in a square structure as an example.

Figure 4:
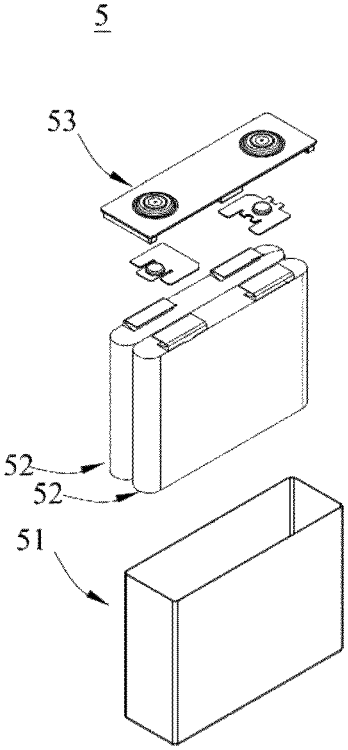
FIG. 4 is an exploded view of the lithium ion secondary battery according to the embodiment of the present application shown in FIG. 3.

In some embodiments, with reference to FIG. 4, an outer packaging may include a housing 51 and a cover plate 53. Among them, the housing 51 may include a bottom plate and side plates connected to the bottom plate, and the bottom plate and side plates are enclosed to form an accommodating cavity. The housing 51 has an opening communicating with the accommodating cavity, and the cover plate 53 can cover the opening to close the accommodating cavity. The positive electrode sheet, the negative electrode sheet, and the separator may form an electrode assembly 52 through a winding process or a lamination process. The electrode assembly 52 is sealed and packaged in the accommodating cavity. An electrolytic solution is infiltrated into the electrode assembly 52. The number of electrode assemblies 52 included in the lithium ion secondary battery 5 may be one or more, which may be selected by those skilled in the art according to the specific actual requirements.

In some embodiments, lithium ion secondary batteries may be assembled into a battery module 4, the number of lithium ion secondary batteries included in the battery module 4 may be one or more, and the specific number may be selected by those skilled in the art according to application and capacity of the battery module 4. In the battery module 4, multiple lithium ion secondary batteries 5 may be provided along a length direction of the battery module in sequence. Certainly, they may also be arranged in any other manner. Further, the multiple lithium ion secondary batteries 5 may be fixed with fasteners. Optionally, the battery module 4 may further include a housing having an accommodating space, and the multiple lithium ion secondary batteries 5 are accommodated in the accommodating space.

In some embodiments, the above lithium ion secondary batteries 5 or battery modules 4 may be assembled into a battery pack 1, the number of lithium ion secondary batteries 5 or battery modules 4 included in the battery pack 1 may be selected by those skilled in the art according to application and capacity of the battery pack 1.

Figure 5:
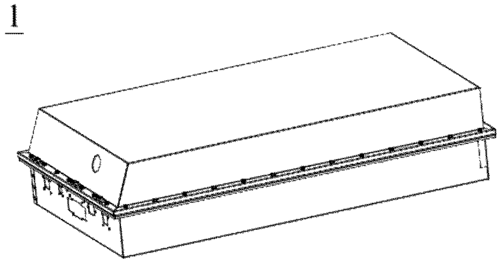
FIG. 5 is a schematic diagram of a battery pack according to an embodiment of the present application.
Figure 6:
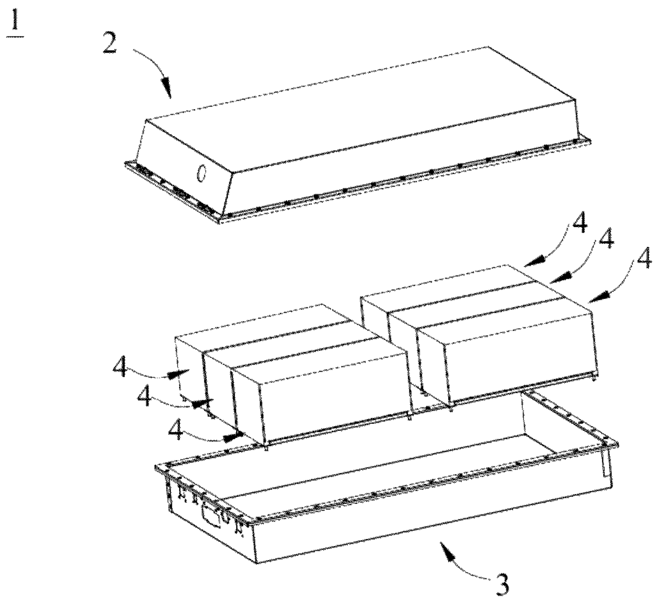
FIG. 6 is an exploded view of the battery pack according to the embodiment of the present application shown in FIG. 5.

FIG. 5 and FIG. 6 are a battery pack 1 as an example. With reference to FIG. 5 and FIG. 6, the battery pack 1 may include a battery box and multiple battery cells provided in the battery box. The battery box includes an upper box body 2 and a lower box body 3, the upper box body 2 can cover the lower box body 3 and form an enclosed space for accommodating the battery cells.

In addition, the present application further provides an apparatus, and the apparatus includes the battery pack provided by the present application. The battery pack may be used as a power source of the apparatus, or as an energy storage unit of the apparatus. The apparatus may be, but is not limited to, mobile devices (such as, mobile phones or a notebook computers), electric vehicles (such as, full electric vehicles, hybrid electric vehicles, plug-in hybrid electric vehicles, electric bicycles, electric scooters, electric golf carts, electric trucks), electric trains, ships and satellites, energy storage systems, and the like.

As the apparatus, the battery pack may be selected according to the usage requirements thereof.

Figure 7:
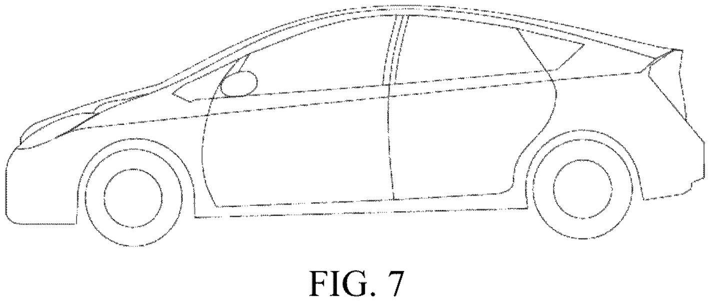
FIG. 7 is a schematic diagram of a device in which a battery pack is used as a power source according to an embodiment of the present application.

FIG. 7 is an apparatus as an example. The apparatus is a full electric vehicle, a hybrid electric vehicle, a plug-in hybrid electric vehicle, and the like. To satisfy the requirements of the apparatus for high power and high energy density of a lithium ion secondary battery, a battery pack or a battery module may be adopted.

EMBODIMENTS

Embodiments of the present application will be described below. The embodiments described hereinafter are illustrative and merely used to explain the present application, and should not be understood as limiting the present application. If no specific technique or condition is indicated in the embodiments, it shall be carried out in accordance with the technique or condition described in literatures in the art or in accordance with a product specification. Reagents or instruments used without indicating manufacturers are all conventional products that may be acquired from the market.

Embodiment 1

Preparation of Positive Electrode Sheet

Mix a positive electrode active material of lithium iron phosphate LPF, a conductive agent of conductive carbon black, and an aqueous binder according to a weight ratio of 96:1:3, where the aqueous binder adopts a compound mixture of xanthan gum (with the molecular weight of about 1,000,000 g/mol, purchased from Shanghai Aladdin Biochemical Technology Co., Ltd.) and polyethyleneimine (with the molecular weight of about 10000 g/mol, purchased from Shanghai Aladdin Biochemical Technology Co., Ltd.), with a compound weight ratio of 3:0 (that is, in the embodiment 1, the aqueous binder is merely the xanthan gum); evenly stir and mix the balance with a solvent of deionized water to acquire a positive electrode slurry with solid content of 50%; after that, perform a corona pretreatment on an aluminum foil positive electrode current collector with a treatment voltage of 20 kV, then evenly coat a positive electrode slurry on the positive electrode current collector, and conduct drying, cold pressing, and slitting to acquire the positive electrode sheet.

Preparation of Negative Electrode Sheet

Dissolve an active substance of artificial graphite, a conductive agent of carbon black, a binder of styrene butadiene rubber (SBR), and a thickener of carboxymethylcellulose sodium (CMC) in a solvent of deionized water according to a mass ratio of 96.2:0.8:0.8:1.2, evenly mix them to acquire a negative electrode slurry, then evenly coat the negative electrode slurry on copper foil of a negative electrode current collector for many times, and acquire a negative electrode sheet after drying, cold pressing, and slitting.

Preparation of Electrolytic Solution

In an argon atmosphere glove box ($H_2O$<0.1 ppm, $O_2$<0.1 ppm), evenly mix an organic solvent of ethylene carbonate (EC)/ethyl methyl carbonate (EMC) according to a volume ratio of 3/7, then add 12.5% $LiPF_6$ lithium salt and dissolve it in the organic solvent, and evenly stir to acquire an electrolytic solution.

Separator

A 2 μm thick ceramic coating is used as a separator after being coated with a PE porous thin film.

Embodiments 2-7

Except for a difference of a compound ratio of aqueous binders of xanthan gum and polyethyleneimine, other steps are the same as in embodiment 1.

Embodiments 8-12

Except for a difference of an electrode voltage applied in current collector corona treatment, other steps are the same as in embodiment 5.

Embodiment 13

Except that a current collector does not adopt corona treatment, other steps are the same as in embodiment 5.

Comparative Example 1

Except that the aqueous binder materials are different, other steps are the same as in embodiment 5.

Comparative Example 2

Except that a current collector does not adopt corona treatment, other steps are the same as in comparative example 1.

Production of Lithium Ion Battery

Stack the positive electrode sheet, the separator, and the negative electrode sheet of embodiment 1 in sequence, such that the separator is between the positive and negative electrode sheets to play the role of separation, then wind them to acquire a bare battery, weld tabs to the bare battery, and place the bare battery into an aluminum housing, and bake it at 80° C. to remove water, then inject an electrolytic solution and seal to acquire an uncharged battery. The uncharged battery is then subjected to standing, hot and cold pressing, formation, shaping, capacity testing and other processes in sequence to acquire the lithium ion secondary battery product of embodiment 1.

The lithium ion secondary battery products of embodiments 2-13 and comparative examples 1-2 are also prepared according to the above steps.

Preparation parameters of the positive electrode sheets and lithium ion secondary batteries of embodiments 1-13 and comparative examples 1-2 are listed in Table 1 below.

Test methods for each parameter of a positive electrode sheet and a battery is as follows:

1) Test of Contact Angle:

A contact angle refers to an included angle θ between a tangent line of a gas-liquid interface and a solid-liquid boundary at an intersection of gas, liquid and solid phases, which is a measurement of wettability; if θ <90°, the solid is lyophilic, that is, the liquid may wet the solid, and the smaller the angle, the better the wettability, and if θ>90°, the solid is lyophobic, that is, the liquid may not wet the solid, easily moves on a surface and cannot enter pores; and in the present invention, the test of the contact angle is directly performed with reference to a GB/T 30693-2014 standard document, and deionized water is adopted as a liquid reagent.

2) Test of Appearance of Positive Electrode Sheet:

Observe an appearance of the prepared positive electrode sheet, and classify according to the following standards:

If the appearance has no abnormal phenomena such as scratches and bumps, it is recorded as excellent;

If an appearance scratch is less than 1, and no metal is exposed or the bump is ≤3, it is recorded as good;

If appearance scratches are more than 1 or the bumps are >3, it is recorded as poor.

3) Test of Bond Strength:

A test of bond strength is a test of 180° peel strength. Select a high-speed rail tensile machine AI-7000S, and a test standard is GB/T 36363-2018; take an electrode sheet to be tested (a positive electrode sheet with an active substance layer coated on both sides of a current collector), where an appearance of the electrode sheet is good, and no defective products are allowed; use a blade to cut a sample with the width of 30 mm and the length of 100-160 mm; paste a special double-sided tape NITTO.NO5000NS on a steel plate, where the width of the tape is 20 mm and the length of the tape is 90-150 mm; paste a fixed-size electrode sheet sample cut above on the double-sided tape, with a test side facing down, and then use a 3 kg pressure roller to roll three times in the same direction on a surface of the positive electrode sheet; insert a paper tape with the same width as the electrode sheet and the length of 80-200 mm longer than the sample length under the electrode sheet, and fix it with a crepe glue; then fix the sample on a tester, fix an end of the steel plate that is not attached to the electrode sheet with a lower clamp, fold the paper tape upwards, and fix it with an upper clamp, where an axis direction of the electrode sheet shall be consistent with a direction of force application; use the high-speed railway tensile machine AI-7000S tester to load at a peel speed of 10 mm/min until the positive electrode sheet breaks, stop the test, record a maximum load force as F (unit: N) and the width of the electrode sheet as L=20 mm, and calculate peel strength f1 (unit: N/m) according to f1=F/L.

4) Test of Cohesive:

A test of cohesive is a test of 180° cut strength. Select a high-speed rail tensile machine AI-7000S; take an electrode sheet to be tested (a positive electrode sheet with an active substance layer coated on both sides of a current collector), where an appearance of the electrode sheet is good, and no defective products are allowed; use a blade to cut a sample with the width of 30 mm and the length of 100-160 mm; paste a special double-sided tape NITTO.NO5000NS on a steel plate, where the width of the tape is 20 mm and the length of the tape is 90-150 mm; paste a fixed-size electrode sheet sample cut above on the double-sided tape, with a test side facing down, then smoothly paste a low viscosity green tape MD-XTG-620-2335L with the width of 20 mm and the length of 80-200 mm longer than the sample length on a surface of a test face; and then use a 3 kg pressure roller to roll three times in the same direction on a surface of the positive electrode sheet; then fix the sample on a tester, fix an end of the steel plate that is not attached to the electrode sheet with a lower clamp, fold the green tape upwards, and fix it with an upper clamp, where an axis direction of the electrode sheet shall be consistent with a direction of force application; load the tester at a peel speed of 10 mm/min until the positive electrode sheet breaks, stop the test, record a maximum load force as F (unit: N) and the width of the electrode sheet as L=20 mm, and calculate cut strength f2 (unit: N/m) according to f1=F/L.

5) Test of Winding and Hot Pressing of Positive Electrode Sheet:

Wind a positive electrode sheet, a separator, and a negative electrode sheet into a square battery, then conduct hot pressing at 90° C. and 0.8 MPa pressure, and then disassemble the battery and observe whether there is light leakage or not at the crease, where the battery acquired by winding has a total of 45 creases. Test each set 5 times and take an average value.

6) Test of Positive Electrode Membrane Folding:

After folding a positive electrode membrane, use a 2 kg roller to roll back and forth 3 times, then lay the positive electrode membrane flat, and repeat the above operation until light leakage occurs at the fold, and record the number of folds. Test each set 5 times and take an average value.

7) Test of Membrane Resistance of Positive Electrode Sheet

Use a CRM-01 membrane resistance tester to test a membrane resistance of a positive electrode sheet. Test each set 5 times and take an average value.

8) Test of Direct Current Impedance of Battery

Take embodiment 1 as an example, and a test process of a direct current impedance of a battery is as follows: at 25° C., charge the battery corresponding to embodiment 1 with a constant current of 1/3 C to 3.65 V, then charge it with a constant voltage of 3.65 V to a current of 0.05 C, and record a voltage V1 after leaving it for 5 minutes; then discharge it at 1/3 C for 30 s, and record a voltage V2, so (V2−V1)/1/3 C, and acquire an internal resistance DCR of the battery.

9) Test of Capacity Retention Rate of Battery

Take embodiment 1 as an example, a test process of a capacity retention rate of a battery is as follows: at 25° C., charge the battery corresponding to embodiments with a constant current of 1/3 C to 3.65 V, then charge it at a constant voltage of 3.65 V to a current of 0.05 C, stand for 5 minutes, then discharge it at 1/3 C to 2.7 V, and record a resulting capacity as an initial capacity C0. Repeat the above steps for the same battery aforesaid, while recording a discharge capacity Cn of the battery after the nth cycle, then after each cycle, a battery capacity retention rate is Pn=Cn/C0*100%. During the test, the first cycle corresponds to n=1, the second cycle corresponds to n=2, . . . the 100th cycle corresponds to n=100. The battery capacity retention rate data corresponding to embodiment 1 in Table 1 is the data measured after 800 cycles under the above test conditions, that is, a value of P800. The test process of comparative example 1 and other embodiments is the same as the above.

The positive electrode sheet and battery prepared in each embodiment is tested, and test results are shown in Table 1.

TABLE 1

Performance Test of Positive Electrode Sheet and Battery of Embodiments 1-13 and Comparative Examples 102

| Sequence number | Corona treatment: None | Corona treatment: Treatment voltage/kV | Aqueous binder weight ratio: Xanthan gum | Aqueous binder weight ratio: Polyethyleneimine | Property of current collector: Contact angle between current collector and water/° | Property of positive electrode sheet: Bond strength: AT/N/n | Property of positive electrode sheet: Cohesive CT/N/m | Property of positive electrode sheet: CT/AT | Property of positive electrode sheet: Appearance of electrode sheet | Property of positive electrode sheet: Number of light leakages of winding and hot pressing creases | Property of positive electrode sheet: Number of light leakages folding | Membrane resistance/Ω | Battery performance: Direct curent impedance of battery/Ω | Battery performance: Capacity retention rate of battery/% |
|---|---|---|---|---|---|---|---|---|---|---|---|---|---|---|
| Embodiment 1 | Have | 20 | 3 | 0 | 38 | 8 | 70 | 8.8 | Good | 1/45 | 2.3 | 0.76 | 2.13 | 98.0 |
| Embodiment 2 | Have | 20 | 2 | 1 | 38 | 12 | 72 | 6.0 | Good | 0/45 | 3.1 | 0.64 | 1.95 | 98.1 |
| Embodiment 3 | Have | 20 | 1.5 | 1.5 | 38 | 20 | 84 | 4.2 | Excellent | 0/45 | 3.9 | 0.57 | 1.89 | 98.2 |
| Embodiment 4 | Have | 20 | 1 | 2 | 38 | 29 | 101 | 3.5 | Excellent | 0/45 | 4.2 | 0.44 | 1.82 | 98.3 |
| Embodiment 5 | Have | 20 | 0.5 | 2.5 | 38 | 32 | 114 | 3.6 | Excellent | 0/45 | 5.1 | 0.34 | 1.64 | 98.6 |
| Embodiment 6 | Have | 20 | 0.2 | 2.8 | 38 | 31 | 101 | 3.3 | Excellent | 0/45 | 4.9 | 0.37 | 1.71 | 98.5 |
| Embodiment 7 | Have | 20 | 0 | 3 | 38 | 24 | 69 | 2.9 | Good | 0/45 | 3.2 | 0.67 | 1.83 | 98.1 |
| Embodiment 8 | Have | 5 | 0.5 | 2.5 | 87 | 33 | 102 | 7.8 | Good | 0/45 | 2.9 | 0.71 | 1.85 | 98.0 |
| Embodiment 9 | Have | 10 | 0.5 | 2.5 | 64 | 25 | 111 | 4.4 | Excellent | 0/45 | 2.7 | 0.62 | 1.91 | 98.1 |
| Embodiment 10 | Have | 15 | 0.5 | 2.5 | 48 | 29 | 99 | 3.4 | Excellent | 0/45 | 3.1 | 0.55 | 1.84 | 98.2 |
| Embodiment 11 | Have | 25 | 0.5 | 2.5 | 32 | 34 | 105 | 3.1 | Excellent | 0/45 | 4.7 | 0.38 | 1.59 | 98.4 |
| Embodiment 12 | Have | 30 | 0.5 | 2.5 | 27 | 41 | 134 | 3.3 | Excellent | 0/45 | 3.3 | 0.79 | 2.15 | 98.0 |
| Embodiment 13 | None | NA | 0.5 | 2.5 | 94 | 6 | 100 | 16.7 | Good | 1/45 | 2.5 | 1.07 | 3.12 | 97.0 |
| comparing embodiment 1 | Have | 20 | CMC-Na 0.5 | LA-133 2.5 | 38 | 12 | 125 | 10.5 | Bad | 3/45 | 3.1 | 1.15 | 3.44 | 88.2 |
| Comparative Example 2 | None | NA | CMC-Na 0.5 | LA-133 2.5 | 94 | 5 | 92 | 18.4 | Bad | 4/45 | 2.2 | 0.99 | 2.99 | 79.6 |

As can be seen from Table 1, for the lithium ion secondary battery of embodiments 1-12 of the present invention, when the ratio of CT/AT of the positive electrode sheet thereof is in a range of 1 to 10, the electrode sheet has a good appearance, with little or no light leakage at the winding and hot pressing creases of the electrode sheet, a high number of light leakages at the fold of the electrode sheet, and a low membrane resistance. At the same time, the direct current impedance of the lithium ion secondary battery prepared by the positive electrode sheet is low, while the capacity retention rate of the battery is high. When the ratio of CT/AT of the positive electrode sheet is in the range of 1 to 8, the above characteristics are basically further improved. Among them, for embodiments 1-7, when the current collector is subjected to the corona treatment and the voltage is maintained at 20 kV, a specific ratio of the xanthan gum to the polyethyleneimine in the aqueous binder further improves the performance of the positive electrode sheet and the secondary battery. For embodiments 8-12, when the ratio of the xanthan gum to the polyethyleneimine in the aqueous binder is maintained constant, the voltage during the corona treatment is maintained at 10-25 kV, which may further reduce the membrane resistance.

For embodiment 13, the ratio of CT/AT is higher than 10 because no corona treatment is performed on the positive electrode current collector. Although the capacity retention rate of the secondary battery is still high, the resistance of the positive electrode sheet is significantly increased, and the direct current impedance of the secondary battery is also high.

In contrast, comparative example 1 uses a voltage of 20 kV to performed the corona treatment on the positive electrode current collector, but uses a conventional binder composed of sodium carboxymethylcellulose and an acrylonitrile-acrylic acid ester copolymer, and a value of CT/AT of the positive electrode sheet is higher than 10. The results show that the appearance of the positive electrode sheet prepared by comparative example 1 is poor, and there are many light leakages at the winding hot and pressing creases of the electrode sheet and the membrane resistance significantly increases, while the resulting direct current impedance of the secondary battery is high and the capacity retention rate is also significantly reduced. For the comparative example 2 on the basis of comparative example 1, a step of performing the corona treatment on the positive electrode current collector is omitted. As a result, the characteristics of the positive electrode sheet and the secondary battery are deteriorated to different degrees on the basis of comparative example 1.

In addition, on the basis of maintaining the ratio of CT/AT of the positive electrode sheet in the range of 1 to 10, especially in the range of 1 to 8, by adjusting the voltage after the corona treatment to a specific range and adjust the proportion of the xanthan gum and the polyethyleneimine in the binder to a specific range, the performance of the positive electrode sheet and the secondary battery prepared thereof may both be further improved.

Although the present application has been described with reference to the embodiments, various modifications can be made thereto without departing from the scope of the present application, and the components therein may be replaced with equivalents. In particular, the technical features mentioned in each embodiment may be combined in any manner, as long as there is no structural conflict. The present application is not limited to the specific embodiments disclosed herein, but includes all technical solutions falling within the scope of the claims.

What is claimed is:

1. An aqueous positive electrode sheet, comprising:

a current collector and a positive electrode active substance layer provided on at least one surface of the current collector, the positive electrode active substance layer comprises an aqueous binder, wherein the aqueous binder is a compound mixture of xanthan gum and polyethyleneimine, a compound ratio of xanthan gum to polyethyleneimine is 1:2 to 1:14, and the average molecular weight Mn of the xanthan gum is 300000-2000000 g/mol, and the average molecular weight Mn of the polyethyleneimine is 2000-50000 g/mol;

wherein bond strength AT between the positive electrode active substance layer and the current collector and cohesive CT of the positive electrode active substance layer satisfy the following relationship: $1 \leq CT/AT \leq 10$.

2. The positive electrode sheet according to claim 1, wherein a contact angle between the current collector and water is 5°-90°.

3. The positive electrode sheet according to claim 1, wherein the bond strength AT between the positive electrode active substance layer and the current collector is 6-45 N/m, or the cohesive CT of the positive electrode active substance layer is 40-140 N/m.

4. The positive electrode sheet according to claim 1, wherein a range of a ratio of CT to AT is 2-8.

5. The positive electrode sheet according to claim 1, wherein a proportion of the aqueous binder in the positive electrode active substance layer is 0.5-10 weight %, based on the total weight of the positive electrode active substance layer.

6. The positive electrode sheet according to claim 1, wherein the current collector comprises surface modified aluminum foil.

7. The positive electrode sheet according to claim 1, wherein the current collector comprises a current collector pretreated and activated by high surface energy, and a pretreatment process comprises corona treatment, plasma treatment, rolling, polar solvent coating, or a combination thereof.

8. The positive electrode sheet according to claim 1, wherein a treatment voltage during the corona treatment is 5-30 kV.

9. The positive electrode sheet according to claim 1, wherein the positive electrode active substance layer comprises a positive electrode active material, and the positive electrode active material is selected from one or more of lithium iron phosphate, lithium manganese phosphate, lithium cobalt phosphate, lithium iron manganese phosphate, lithium cobalt oxide, lithium nickel oxide, lithium manganese oxide, lithium nickel manganese oxide, lithium nickel cobalt manganese oxide, and lithium nickel cobalt aluminum oxide.

10. The positive electrode sheet according to claim 1, wherein the positive electrode active substance layer comprises a conductive agent, and the conductive agent comprises one or more of conductive carbon black, superconducting carbon black, conductive graphite, acetylene black, Ketjen black, graphene, and carbon nanotubes.

11. The positive electrode sheet according to claim 1, wherein the aqueous binder comprises soluble polysaccharides and derivatives thereof, water-soluble or water-dispersed high polymers or mixtures thereof.

12. The positive electrode sheet according to claim 1, wherein the aqueous binder is methylcellulose and salt thereof, xanthan gum and salt thereof, chitosan and salt thereof, alginate and salt thereof, polyethyleneimine and salt thereof, polyacrylamide, acrylonitrile-acrylic acid copolymers and derivatives thereof, or mixtures of the above substances.

13. The positive electrode sheet according to claim 1, wherein the aqueous binder is a compound mixture of soluble polysaccharides and derivatives thereof and water-soluble or water-dispersed high polymers, and a compound ratio is 2:1-1:15.

14. The positive electrode sheet according to claim 1, wherein a membrane resistance of the positive electrode sheet is 0.3 to 1 Ω.

15. A secondary battery, comprising the aqueous positive electrode sheet according to claim 1.

16. A battery pack, comprising the secondary battery according to claim 15.

17. A power consumption apparatus, comprising the secondary battery according to claim 15.

18. A power consumption apparatus, comprising the battery pack according to claim 16.

* * * * *